United States Patent
Abeysekera et al.

(10) Patent No.: US 12,035,336 B2
(45) Date of Patent: Jul. 9, 2024

(54) WIRELESS COMMUNICATION SYSTEM, AND WIRELESS COMMUNICATION METHOD

(71) Applicant: NIPPON TELEGRAPH AND TELEPHONE CORPORATION, Tokyo (JP)

(72) Inventors: Hirantha Abeysekera, Musashino (JP); Toshiro Nakahira, Musashino (JP); Shoko Shinohara, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 353 days.

(21) Appl. No.: 17/435,290

(22) PCT Filed: Feb. 25, 2020

(86) PCT No.: PCT/JP2020/007476
§ 371 (c)(1),
(2) Date: Aug. 31, 2021

(87) PCT Pub. No.: WO2020/179546
PCT Pub. Date: Sep. 10, 2020

(65) Prior Publication Data
US 2022/0159644 A1    May 19, 2022

(30) Foreign Application Priority Data
Mar. 4, 2019    (JP) .................................. 2019-039035

(51) Int. Cl.
H04W 72/04    (2023.01)
H04W 72/0453    (2023.01)
H04W 72/51    (2023.01)

(52) U.S. Cl.
CPC ....... *H04W 72/51* (2023.01); *H04W 72/0453* (2013.01)

(58) Field of Classification Search
CPC . H04W 72/0453; H04W 16/14; H04W 72/51; H04W 8/22; H04W 84/12
See application file for complete search history.

(56) References Cited

U.S. PATENT DOCUMENTS 10,973,028 B2 *  4/2021  Husted ................. H04W 72/51
11,057,495 B2 *  7/2021  Fedorov .............. H04L 41/5054
(Continued)

FOREIGN PATENT DOCUMENTS

JP    2014-60536 A    4/2014

OTHER PUBLICATIONS

"*Kaitei Sanpan 802.11 Kousoku Musen LAN Kyoukasyo* (802.11 High-speed wireless LAN textbook third revised edition)", supervised by Masahiro Morikura and Shuji Kubota, pp. 5 to 10, Apr. 2008, Impress R & D.
Abeyseksra, Hirantha, Strategy Management Architecture for Wireless Resource Optimization (WiSMA), IEICE technical report vol. 118, No. 8, Apr. 2018, sections 1-5.

(Continued)

*Primary Examiner* — Liton Miah
(74) *Attorney, Agent, or Firm* — Harness, Dickey & Pierce, P.L.C.

(57) ABSTRACT

In a wireless communication system in which a plurality of wireless stations perform transmission on a shared frequency band, the wireless stations each include means for notifying a wireless station control apparatus of capability and environment information that includes information about capability of a local wireless station and information about a surrounding environment, and the wireless station (Continued)

control apparatus includes control means for selecting, based on capability and environment information collected from the wireless station, a frequency band to be used for the wireless station capable of using a plurality of frequency bands in accordance with a predetermined control index and setting the selected frequency band. Based on an area coverage rate of the wireless station as the control index, a frequency band with which an area coverage rate of the wireless station having an area coverage rate of less than or equal to a predetermined threshold is improved is selected.

3 Claims, 7 Drawing Sheets

(56) References Cited

U.S. PATENT DOCUMENTS

| | | | |
|---|---|---|---|
| 2012/0184204 A1* | 7/2012 | Kazmi | H04B 7/15542 455/7 |
| 2014/0362688 A1* | 12/2014 | Zhang | H04L 41/5067 370/230 |
| 2019/0239225 A1* | 8/2019 | Siraj | H04W 72/0453 |
| 2019/0364566 A1* | 11/2019 | Husted | H04W 72/0453 |

OTHER PUBLICATIONS

International Search Report and Written Opinion of the International Searching Authority issued in PCT/JP2020/007476, mailed on May 26, 2020; ISA/JPO.

* cited by examiner

WIRELESS COMMUNICATION SYSTEM, AND WIRELESS COMMUNICATION METHOD

CROSS-REFERENCE TO RELATED APPLICATIONS

This application is a 371 U.S. National Phase of International Application No. PCT/JP2020/007476 filed on Feb. 25, 2020 which claims priority to Japanese Application No. 2019-039035 filed on Mar. 4, 2019. The entire disclosures of the above applications are incorporated herein by reference.

TECHNICAL FIELD

The present invention relates to a wireless communication system and a wireless communication method that selects an operating frequency band of a wireless station in a wireless local area network (LAN) system so as to increase the area coverage rate and improve the throughput of the entire system.

BACKGROUND ART

In recent years, with the spread of portable high-performance wireless terminals such as laptop personal computers and smartphones, wireless LANs of the IEEE802.11 standard have been widely used not only in businesses and public spaces but also in ordinary households. Wireless LANs of the IEEE802.11 standard include wireless LANs of the IEEE802.11b/g/n standards using a 2.4 GHz band, and wireless LANs of the IEEE802.11a/n/ac standards using a 5 GHz band.

In a wireless LAN of the IEEE802.11b standard or the IEEE802.11g standard, 13 channels are prepared at intervals of 5 MHz between 2400 MHz and 2483.5 MHz. However, when a plurality of channels are used in the same location, if the channels are used such that spectra do not overlap so as to avoid interference, a maximum of 3 channels, or in some cases, 4 channels can be simultaneously used.

In a wireless LAN of the IEEE802.11a standard, 8 channels and 11 channels to make a total of 19 channels that do not overlap with each other are defined between 5170 MHz and 5330 MHz and between 5490 MHz and 5710 MHz in Japan. The bandwidth per channel is fixed at 20 MHz in the IEEE802.11a standard.

The maximum transmission rate of the wireless LAN is 11 Mbps in the IEEE802.11b standard, and 54 Mbps in the IEEE802.11a standard and the IEEE802.11g standard. However, the transmission rate here is the transmission rate on the physical layer. Since transmission efficiency in the medium access control (MAC) layer is about 50% to 70%, the upper limit value of actual throughput is about 5 Mbps in the IEEE802.11b standard and about 30 Mbps in the IEEE802.11a standard and the IEEE802.11g standard. In addition, as the number of wireless stations that attempt to transmit information increases, the transmission rate further decreases.

In wired LANs, with the spread of Ethernet (registered trademark) 100 Base-T interface and Fiber to the home (FTTH) using optical fiber in each home, high-speed lines of 100 Mbps to 1 Gbps have been provided. Thus, there has also been a demand for further increase in transmission rate of the wireless LANs.

In view of this, in the IEEE802.11n standard, which was standardized in 2009, the channel bandwidth, which had previously been fixed at 20 MHz, has been expanded to a maximum of 40 MHz, and a multiple input multiple output (MIMO) technology was decided to be introduced. When all functions defined in the IEEE802.11n standard are applied to perform transmission and reception, a maximum communication speed of 600 Mbps can be realized in the physical layer.

Furthermore, in the IEEE802.11ac standard, which was standardized in 2013, the channel bandwidth was expanded to 80 MHz or 160 MHz (or 80+80 MHz) at the maximum, and a multi-user MIMO (MU-MIMO) transmission method using space division multiple access (SDMA) was decided to be introduced. When all functions defined in the IEEE802.11ac standard are applied to perform transmission and reception, a maximum communication speed of approximately 6.9 Gbps can be realized in the physical layer.

In addition, in the IEEE802.11ax standard, which is currently being formulated, orthogonal frequency division multiple access (OFDMA) that enables transmission and reception of frames by dividing each of the 20 MHz, 40 MHz, 80 MHz, 160 MHz, and 80+80 MHz channels described above into smaller subchannels is expected to be defined. The use of OFDMA enables simultaneous transmission by a plurality of wireless stations in resource units by dividing the above channels into smaller subchannels. Furthermore, in the IEEE802.11ax standard, a function in which communication opportunities are increased while interference from other neighboring cells is prevented by performing a carrier sense threshold (clear channel assessment (CCA) threshold) control operation is expected to be defined.

The wireless LANs of the IEEE802.11 standard are operated in a frequency band of a 2.4 GHz band or a 5 GHz band that requires no license to be used. Thus, when a wireless base station of the IEEE802.11 standard forms a wireless LAN cell (BSS: basic service set), the wireless base station selects a frequency channel from frequency channels that the local wireless base station can support and uses the selected frequency channel.

Set values of the channel used in the local cell, the bandwidth, and other parameters and other parameters supported by the local wireless base station are written in a beacon frame that is regularly transmitted, a probe response frame that corresponds to a probe request frame received from a wireless terminal, or the like, and transmitted via the frequency channel determined to be used to notify subordinate wireless terminals and the other neighboring wireless stations of such values and parameters. In this way, the cell is operated.

The frequency channel, the bandwidth, and the other parameters are selected and set in the wireless base station by the following four methods.

(1) A method in which a default parameter value set by a manufacturer of the wireless base station is used as it is.
(2) A method in which a value manually set by a user who operates the wireless base station is used.
(3) A method in which, when each wireless base station is started, the local wireless base station autonomously selects and sets a parameter value based on radio environment information detected in the wireless base station itself.
(4) A method in which a parameter value determined by a centralized control station such as a wireless LAN controller is set.

Since the number of channels that can simultaneously be used at the same location is determined based on the channel bandwidth used for communication, such as 3 channels in the wireless LAN of the 2.4 GHz band and 2, 4, 9, or 19 channels in the wireless LAN of the 5 GHz band, the wireless base station needs to select a channel to be used in the local BSS when the wireless LAN is actually introduced (NPL 2).

When the channel bandwidth is expanded to 40 MHz, 80 MHz, or 160 MHz (or 80+80 MHz), the number of channels that can simultaneously be used at the same location in the 5 GHz band decreases to 9 channels, 4 channels, or 2 channels, respectively, from 19 channels at the channel bandwidth of 20 MHz. That is, the number of usable channels decreases as the channel bandwidth increases.

In a dense environment of a wireless LAN in which the number of BSSs is greater than the number of usable channels, a plurality of BSSs use the same channel (OBSS: overlapping BSS). Therefore, in the wireless LAN, autonomous distributed access control in which data is transmitted only when the channel is free by performing carrier sensing using carrier sense multiple access with collision avoidance (CSMA/CA).

Specifically, first, a wireless station that has generated a transmission request performs carrier sensing for a predetermined sensing period (DIFS: distributed inter-frame space) to monitor a status of a wireless medium, and if no transmission signal from other wireless stations is monitored during this period, the wireless station performs random back-off. The wireless station continues to perform carrier sensing during the random back-off period, and if no transmission signal from she other wireless stations is monitored during this period, the wireless station obtains a channel usage right. The transmission and reception performed by the other wireless stations is determined when a signal larger than a predetermined carrier sense threshold is received. The wireless station that has obtained the channel usage right can transmit data to and receive data from the other wireless stations in the same BSS. When such a CSMA/CA control operation is performed, the channel becomes busy more frequently due to the carrier sensing in the dense environment of the wireless LAN using the same channel. Consequently, the throughput is degraded. Thus, it is important to monitor she surrounding environment and appropriately select, for example, the channel to be used, a transmission power value, a carrier sense threshold, an attenuation value, an OFDMA resource unit, an accommodated traffic amount, and simultaneous transmission based on environment information.

CITATION LIST

Non Patent Literature

[NPL 1] "*Kaitei Sanpan* 802.11 *Kousoku Musen LAN Kyoukasyo* (802.11 High-speed wireless LAN textbook third revised edition)", supervised by Masahiro Morikura and Shuji Kubota, pp. 5 to 10, April, 2008, Impress R & D

SUMMARY OF THE INVENTION

Technical Problem

Since a method for selecting the above parameters such as for selecting between a 2.4 GHz band and a 5 GHz band as an operating frequency band of a wireless base station and a channel to be used in the operating frequency band is not defined in the IEEE802.11 standard, each vendor adopts its unique selection method.

In addition, since the wireless stations each select the above parameters in an autonomous and distributed manner, optimization of the overall system cannot be performed. In particular, there is a problem in that the quality of service for the user could significantly deteriorate in the environment having many wireless stations.

For example, in a case where there are a plurality of wireless stations which can be operated by selecting the frequency band between 2.4 GHz and 5 GHz, the 2.4 GHz band and the 5 GHz band need to be appropriately allocated. Failure to do so would cause many wireless stations to share a small number of channels. Furthermore, this would cause an inefficient operation, for example, a service area may fail to be ensured in any one of the frequency bands, or a service area may unnecessarily be overlapped.

An object of the present invention is to provide a wireless communication system and a wireless communication method that can appropriately set the operating frequency band of respective wireless station so as to provide a user with a high-quality wireless environment by increasing the area coverage rate and improving the throughput of an entire wireless LAN system.

Means for Solving the Problem

According to a first invention, in a wireless communication system in which a plurality of wireless stations perform transmission on a shared frequency band, the wireless stations each include means for notifying a wireless station control apparatus of capability and environment information that includes information about capability of a local wireless station and information about a surrounding environment, and the wireless station control apparatus includes control means for selecting, based on capability and environment information collected from the wireless station, a frequency band to be used for the wireless station capable of using a plurality of frequency bands in accordance with a predetermined control index and setting the selected frequency band.

In the wireless communication system according to the first invention, the control means is configured to select, based on an area coverage rate of the wireless station as the control index, a frequency band with which an area coverage rate of the wireless station having an area coverage rate of less than or equal to a predetermined threshold is improved.

According to a second invention, in a wireless communication method in which a plurality of wireless stations perform transmission on a shared frequency band, the wireless stations each perform a processing step of notifying a wireless station control apparatus of capability and environment information that includes information about capability of a local wireless station and information about a surrounding environment, and the wireless station control apparatus performs a control step of selecting, based on capability and environment information collected from the wireless stations, a frequency band to be used for the wireless station capable of using a plurality of frequency bands in accordance with a predetermined control index and setting the selected frequency band.

In the wireless communication method according to the second invention, the control step selects, based on an area coverage rate of the wireless station as the control index, a frequency hand with which an area coverage rate of the wireless station having an area coverage rate of less than or equal to a predetermined threshold is improved.

Effects of the Invention

The present invention can provide a user with a high-quality wireless environment by appropriately setting the operating frequency each wireless station so as to increase the area coverage rate and improve the throughput of an entire wireless LAN system.

DESCRIPTION OF EMBODIMENTS

Figure 1:
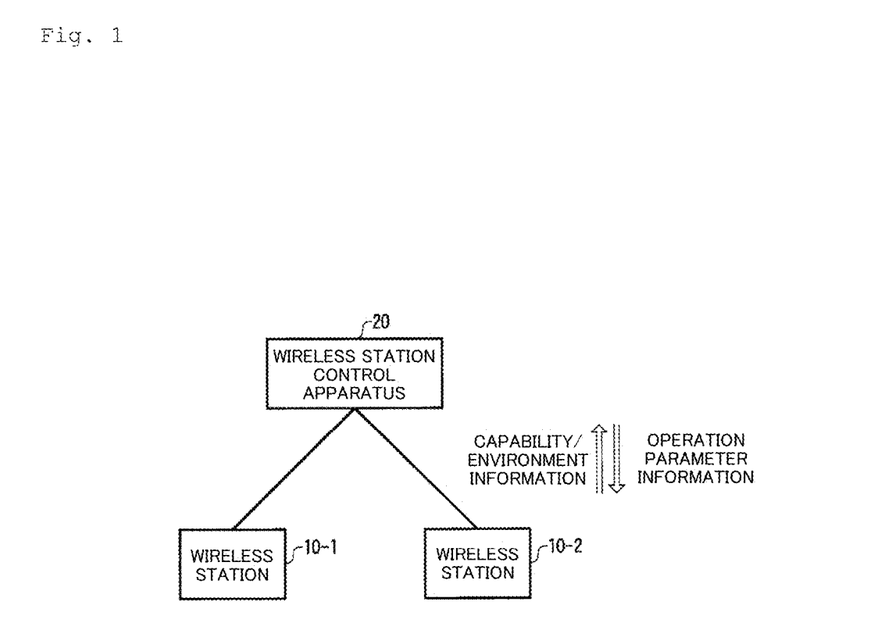
FIG. 1 illustrates a configuration example of a wireless communication system according to the present invention.

FIG. 1 illustrates a configuration example of a wireless communication system according to the present invention.

In FIG. 1, a plurality of wireless stations 10-1 and 10-2 are connected to a wireless station control apparatus 20 in the wireless communication system. Each of the wireless stations 10-1 and 10-2 notifies the wireless station control apparatus 20 of capability/environment information (which will be described in detail below) and operates based on parameter setting information notified from the wireless station control apparatus 20.

Figure 2:
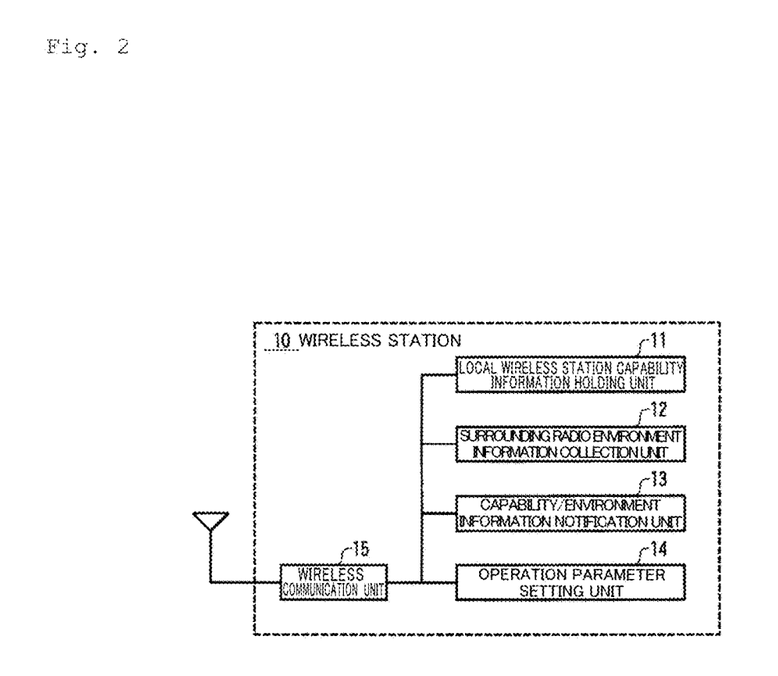
FIG. 2 illustrates a configuration example of a wireless station 10.

FIG. 2 illustrates a configuration example of a wireless station 10.

In FIG. 2, the wireless station 10 includes a local wireless station capability information holding unit 11, a surrounding radio environment information collection unit 12, a capability/environment information notification unit 13, an operation parameter setting unit 14, and a wireless communication unit 15. The local wireless station capability information holding unit 11 holds information about the capability of the local wireless station. The surrounding radio environment information collection unit 12 collects information about the surrounding environment. The capability/environment information notification unit 13 notifies the wireless station control apparatus 20 of the capability information and the surrounding environment information (capability/environment information). The operation parameter setting unit 14 sets operation parameters based on operation parameter information notified from the wireless station control apparatus 20. The information about the capability of the wireless station includes information about a corresponding radio frequency (2.4 GHz/5 GHz), a corresponding wireless standard (11a/b/g/n/ac/ax), the number of antennas accommodated, etc.

Figure 3:
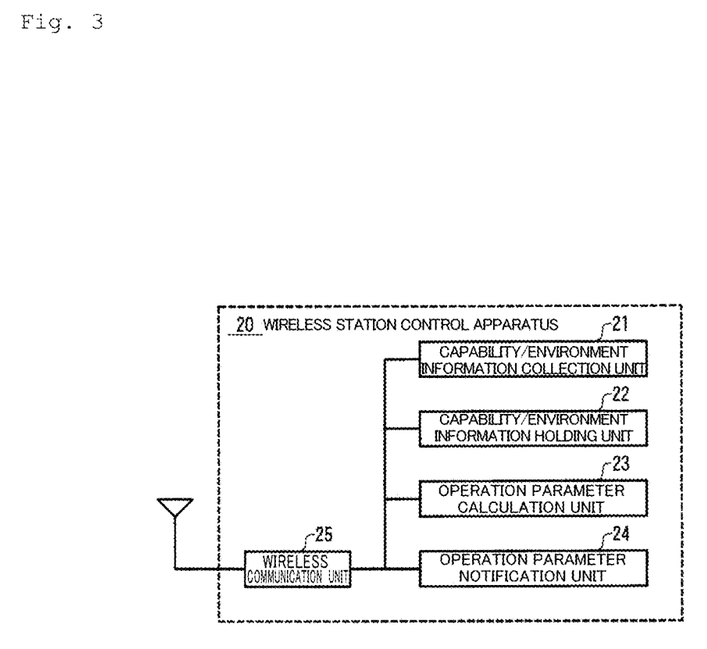
FIG. 3 illustrates a configuration example of a wireless station control apparatus 20.

FIG. 3 illustrates a configuration example of the wireless station control apparatus 20.

In FIG. 3, the wireless station control apparatus 20 includes a capability/environment information collection unit 21, a capability/environment information holding unit 22, an operation parameter calculation unit 23, an operation parameter notification unit 24, and a wireless communication unit 25. The capability/environment information collection unit 21 collects capability/environment information notified from each wireless station. The capability/environment information holding unit 22 holds the collected capability/environment information. The operation parameter calculation unit 23 determines operation parameters for each wireless station based on the collected capability/environment information. The operation parameter notification unit 24 notifies the determined operation parameters. The wireless communication unit 25 performs communication with the wireless stations.

Figure 4:
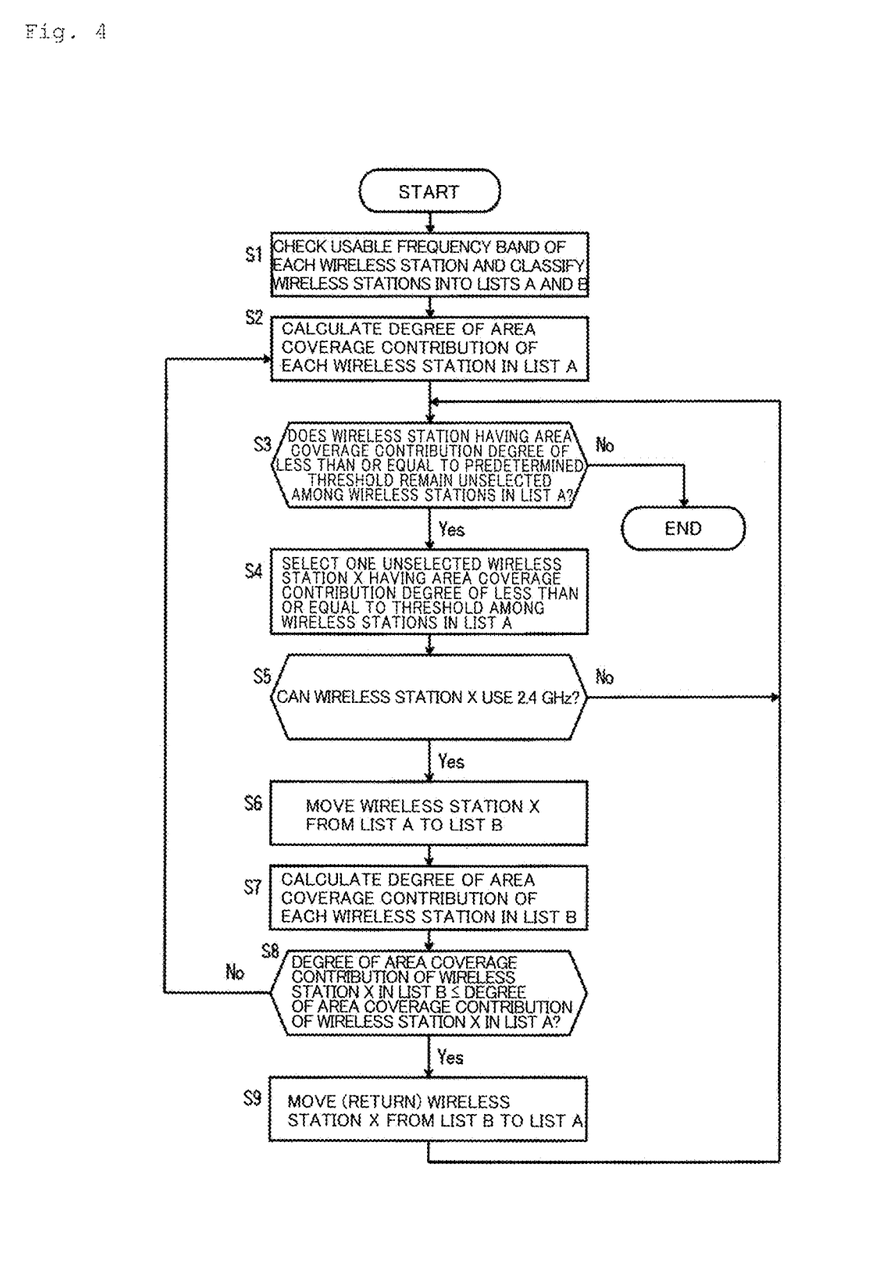
FIG. 4 is a flowchart illustrating an operation procedure of the wireless station control apparatus 20 according to the present invention.

FIG. 4 illustrates an operation procedure of the wireless station control apparatus 20 according to the present invention. The present operation procedure is performed by the operation parameter calculation unit 23 of the wireless station control apparatus 20.

When the present operation procedure in FIG. 4 is started, the operation parameter calculation unit 23 checks a usable frequency band of each of the wireless stations and classifies the wireless stations into list A and list B based on the check results in accordance with a predetermined rule (S1). For example, the wireless station that can use a 5 GHz band is classified into the list A. The wireless station that cannot use the 5 GHz band and can only use a 2.4 GHz band is classified into the list B. Thus, the wireless station capable of switching between the 2.4 GHz band and the 5 GHz band is classed into the list A. Alternatively, the wireless station capable of switching between the 2.4 GHz band and the 5 GHz band may be classified into list C, which will be described below.

Next, the operation parameter calculation unit 23 calculates a degree of area coverage contribution of each of the wireless stations included in the list A by using, for example, the following equation (S2).

Degree of area coverage contribution of wireless station $X$=(the number of measurement points covered only by $X$)/(the number of all measurement points covered by $X$)

The term "covered" in the above equation means to have a signal strength (an RSSI value) equal no or more than a service area threshold R (for example, −75 dBm). The number of measurement points may be replaced by an area having the above signal strength. In an example in FIG. 5, a service area of a wireless station AP 1 includes three measurement points (indicated by stars) covered only by the AP 1 and five measurement points (indicated by stars) covered by the AP 1 in total. Thus, the degree of area coverage contribution of the AP 1 is ⅗. Likewise, the degree of area coverage contribution of an AP 2 ⅓.

Figure 5:
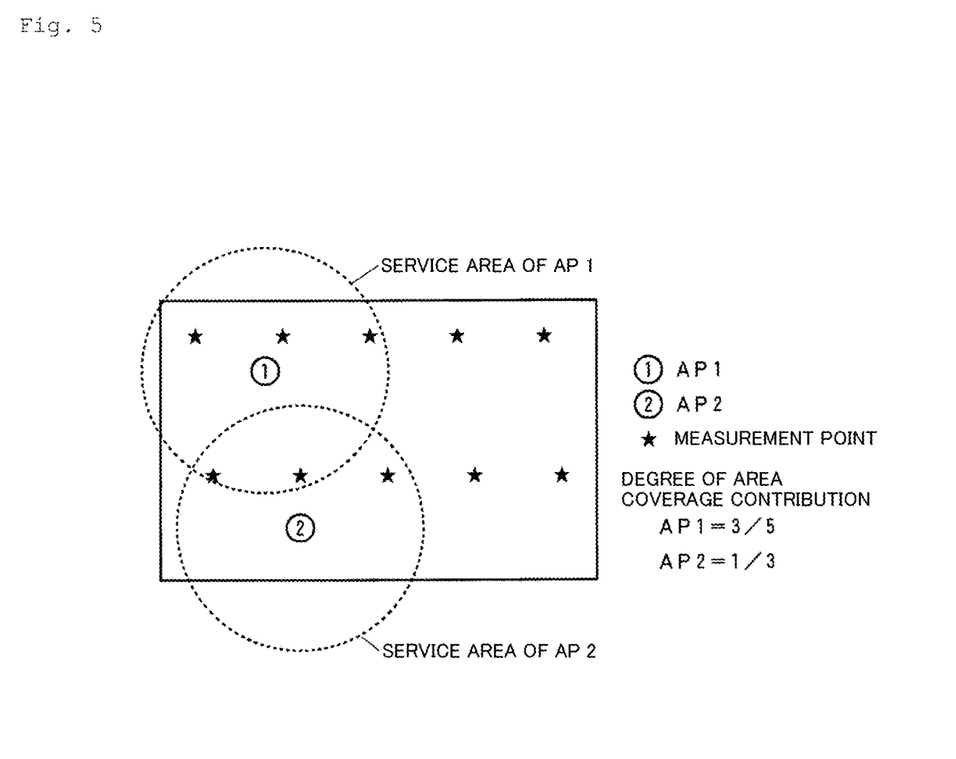
FIG. 5 is a diagram for describing an overview of a degree of area coverage contribution.

The index of the degree of area coverage contribution of the wireless station X is not limited to this example. The degree of area coverage contribution may be determined, for example, in accordance with the degree of importance of a measurement point. An important point may be weighted and reflected on the degree of area coverage contribution, for example.

Next, the operation parameter calculation unit 23 determines whether the wireless station having an area coverage contribution degree of less than or equal to a predetermined threshold remains unselected among the wireless stations included in the list. A (S3), and if not, the processing ends. In contrast, if any wireless station having an area coverage contribution degree of less than or equal to the predetermined threshold remains unselected among the wireless stations included in the list A, the operation parameter calculation unit 23 selects one of such wireless stations as a wireless station X (S4), and checks whether the wireless station X can use the 2.4 GHz frequency band (S5). Next, if she selected wireless station X can use the 2.4 GHz band, this wireless station X is moved from the list A to the list B (S6).

In step S4, if a plurality of wireless stations having area coverage contribution degrees of less than or equal to the predetermined threshold are remained unselected, one wireless station X may be selected therefrom at random or in ascending order of the area coverage contribution degree.

Alternatively, in the processes of steps S4 and S5, one unselected wireless station X having an area coverage contribution degree of less than or equal to the predetermined threshold may be selected from the wireless stations capable of switching between the 2.4 GHz band and the 5 GHz band included in the list A. Yet alternatively, as described above, if the wireless station capable of switching between the 2.4 GHz band and the 5 GHz band is classified into the list C, the wireless station included in the list C may be a target to be selected.

Next, the operation parameter calculation unit 23 calculates a degree of area coverage contribution of each of the wireless stations included in the list B (S7) and determines whether the degree of area coverage contribution of the wireless station X calculated in the list B has been improved, compared to that calculated in the list A (S8). If the area coverage contribution degree has been improved by moving the wireless station X from the list A to the list B, namely, by switching to the 2.4 GHz band, the processing returns to step S2 to recalculate the degree of area coverage contribution of each of the wireless stations included in the list A, and the processes from step S3 onward are repeated.

In contrast, if the degree of area coverage contribution of the wireless station X is not improved by switching to the 2.4 GHz band, the wireless station X is moved (returned) from the list B to the list A (S9). Thus, the processing returns to step S3, and if any other wireless station having an area coverage contribution degree of less than or equal to the predetermined threshold remains unselected among the wireless stations in the list A, the processes from step S4 onward are repeated.

Figure 6:
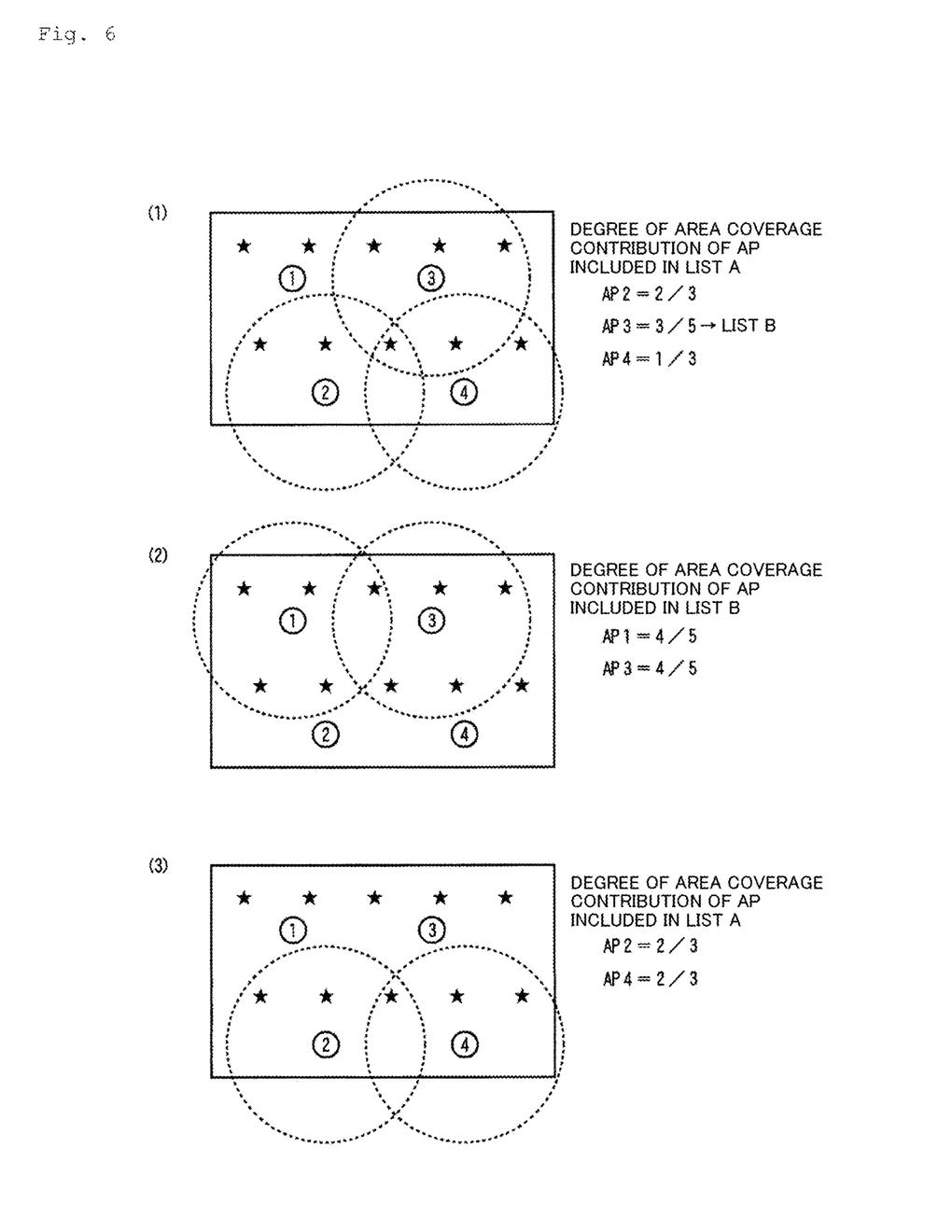
FIG. 6 illustrates example 1 of calculations performed for determining an operating frequency band of a wireless station (AP) according to the present invention.
Figure 7:
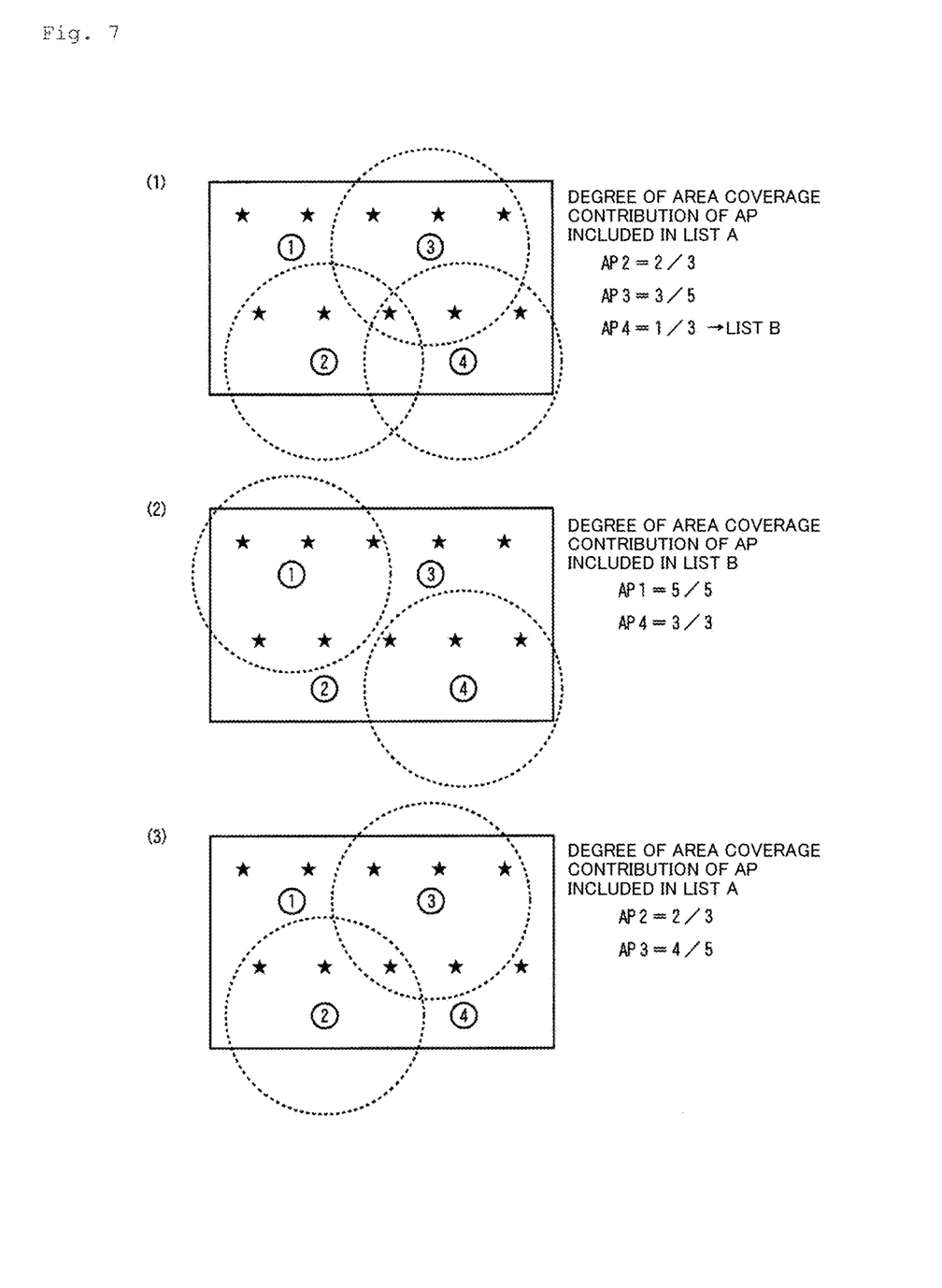
FIG. 7 illustrates example 2 of calculations performed for determining an operating frequency band of a wireless stations (AP) according to the present invention.

FIGS. 6 and 7 illustrate examples of calculations performed for determining the operating frequency band of a wireless station (AP). In FIGS. 6 and 7, an AP 1 can only use the 2.4 GHz band, and an AP 2, an AP 3, and an AP 4 can use the 2.4 GHz band or the 5 GHz band. A threshold R for a service area of each of the APs is −75 dBm, and points inside each circle are included in the service area. A threshold for the area coverage contribution degree is 0.65.

(Scenario 1: FIG. 6)
FIG. 6(1):
S1 List A: {AP 2, AP 3, AP 4}
List B: {AP 1}
S2 Degree of area coverage contribution of AP included in list A
AP 2=2/3
AP 3=3/5
AP 4=1/3
S3 AP having area coverage contribution degree of less than or equal to threshold: {AP 3, AP 4}
S4 Select AP 3
FIG. 6(2):
S6 Move AP 3 to list B, List B: {AP 1, AP 3}
S7 Degree of area coverage contribution of AP included in list B
AP 1=4/5
AP 3=4/5
S8 Degree of area coverage contribution of AP 3 has been improved from 3/5 to 4/5.
AP 3 will use 2.4 GHz band.

FIG. 6(3):
S2 Degree of area coverage contribution of AP included in list A
AP 2=2/3
AP 4=2/3
S3 AP having an area coverage contribution degree of less than or equal to threshold: none (end)
5 GHz: AP 2, AP 4
2.4 GHz: AP 1, AP 3
(Scenario 2: FIG. 7)
FIG. 7(1):
S1 List A: {AP 2, AP 3, AP 4}
List B: {AP 1}
S2 Degree of area coverage contribution of A2 included in list A
AP 2=2/3
AP 3=3/5
AP 4=1/3
S3 AP having an area coverage contribution degree of less than or equal to threshold: {AP 3, AP 4}
S4 Select AP 4
FIG. 7(2):
S6 Move AP 4 to list B, List B: {AP 1, AP 4}
S7 Degree of area coverage contribution of AP included in list B
AP 1=5/5
AP 4=3/3
S8 Degree of area coverage contribution of AP 4 has been improved from 3/5 to 3/3.
AP 4 will use 2.4 GHz band.
FIG. 7(3):
S2 Degree of area coverage contribution of AP included in list A
AP 2=2/3
AP 3=4/5
S3 AP having an area coverage contribution degree of less than or equal to threshold: none (end)
5 GHz: AP 2, AP 3
2.4 GHz: AP 1, AP 4

As described above, in the case where, among the APs 1 to 4, a plurality of APs (AP 3, AP 4) have an area coverage contribution degree less than or equal to the threshold, how the selection is made in step S4 changes the AP to use the 2.4 GHz band. In addition, when the processing returns from step S8 to step S2, the calculation of the area coverage contribution degree is performed again. Therefore, the AP unselected at the previous determination does not necessarily have the degree of area coverage contribution less than or equal to the threshold again.

In the above example, the processing for selecting the wireless station to switch from the 5 GHz band to the 2.4 GHz band has been described. However, the wireless station that makes a switch from the 2.4 GHz band to the 5 GHz band may be selected instead.

In addition, in the above description, the relation between the area coverage contribution degree that corresponds to the range of a service area determined by the RSSI from the wireless station (AP) and the frequency to be used is used as a control index. However, a different control mode may be used. In this control mode, the relation between an area coverage contribution degree that corresponds to a range determined by a carrier sense threshold or a transmission power value and the magnitude of the carrier sense threshold or the transmission power value is used as a control index.

REFERENCE SIGNS LIST

10 Wireless station
20 Wireless station control apparatus

11 Local wireless station capability information holding unit
12 Surrounding radio environment information collection unit
13 Capability/environment information notification unit
14 Operation parameter setting unit
15 Wireless communication unit
21 Capability/environment information collection unit
22 Capability/environment information holding unit
23 Operation parameter calculation unit
24 Operation parameter notification unit
25 Wireless communication unit

The invention claimed is:

1. A wireless communication system in which a plurality of wireless stations perform transmission on a shared frequency band, wherein
the wireless stations each include means for notifying a wireless station control apparatus of capability and environment information that includes information about capability of a local wireless station and information about a surrounding environment, and
the wireless station control apparatus includes control means for selecting, based on capability and environment information collected from the wireless stations, a frequency band to be used for a multi-band wireless station capable of using a plurality of frequency bands, which is included in the wireless stations, in accordance with a predetermined control index and setting the selected frequency band,
wherein the control means, according to the control index, performs
calculating, for each multi-band wireless station, a ratio of a number of measurement points covered only by the multi-band wireless station to a total number of measurement points covered by the multi-band wireless station as a degree of area coverage contribution of the multi-band wireless station,
selecting a multi-band wireless station having a degree of area cover contribution equal to or less than a predetermined threshold, and
selecting a frequency band in which the degree of area coverage contribution is improved for the selected multi-band wireless station.

2. A wireless communication method in which a plurality of wireless stations perform transmission on a shared frequency band, comprising:
causing the wireless stations each to perform notifying wireless station control circuitry of capability and environment information that includes information about capability of a local wireless station and information about a surrounding environment; and
causing the wireless station control circuitry to perform selecting, based on capability and environment information collected from the wireless stations, a frequency band to be used for a multi-band wireless station capable of using a plurality of frequency bands, which is included in the wireless stations, in accordance with a predetermined control index and setting the selected frequency band,
wherein the control index includes
calculating, for each multi-band wireless station, a ratio of a number of measurement points covered only by the multi-band wireless station to a total number of measurement points covered by the multi-band wireless station as a degree of area coverage contribution of the multi-band wireless station,
selecting a multi-band wireless station having a degree of area cover contribution equal to or less than a predetermined threshold, and
selecting a frequency band in which the degree of area coverage contribution is improved for the selected multi-band wireless station.

3. A wireless communication system in which a plurality of wireless stations perform transmission on a shared frequency band, wherein
the wireless stations each are configured to notify wireless station control circuitry of capability and environment information that includes information about capability of a local wireless station and information about a surrounding environment, and
the wireless station control circuitry is configured to select, based on capability and environment information collected from the wireless stations, a frequency band to be used for a multi-band wireless station capable of using a plurality of frequency bands, which is included in the wireless stations, in accordance with a predetermined control index and setting the selected frequency band,
wherein the wireless station control circuitry, according to the control index, performs
calculating, for each multi-band wireless station, a ratio of a number of measurement points covered only by the multi-band wireless station to a total number of measurement points covered by the multi-band wireless station as a degree of area coverage contribution of the multi-band wireless station,
selecting a multi-band wireless station having a degree of area cover contribution equal to or less than a predetermined threshold, and
selecting a frequency band in which the degree of area coverage contribution is improved for the selected multi-band wireless station.

* * * * *